Jan. 18, 1938.　　　H. BOSCH, JR　　　2,105,469
RETRIEVING MECHANISM
Filed June 19, 1935　　　3 Sheets-Sheet 1
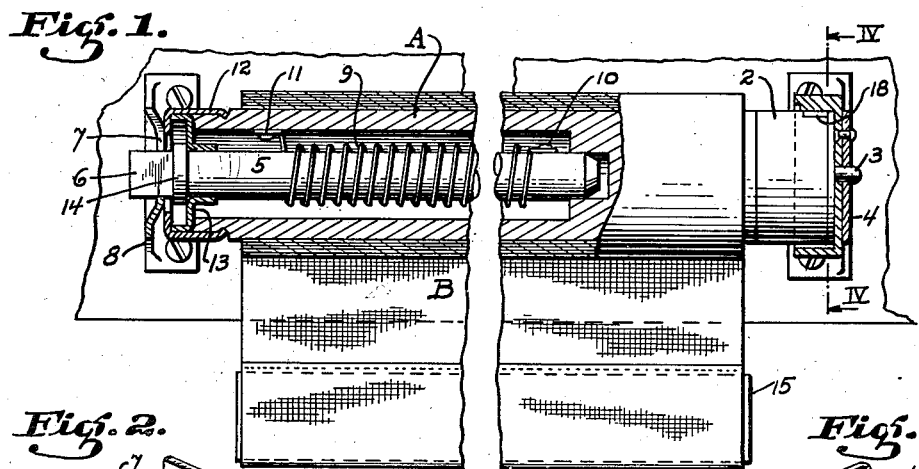
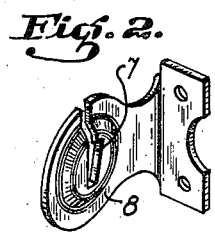
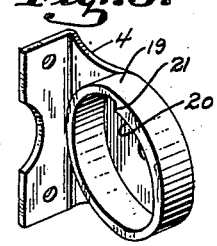
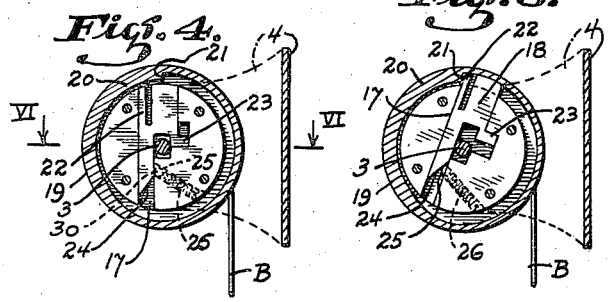
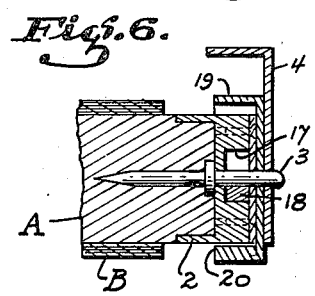
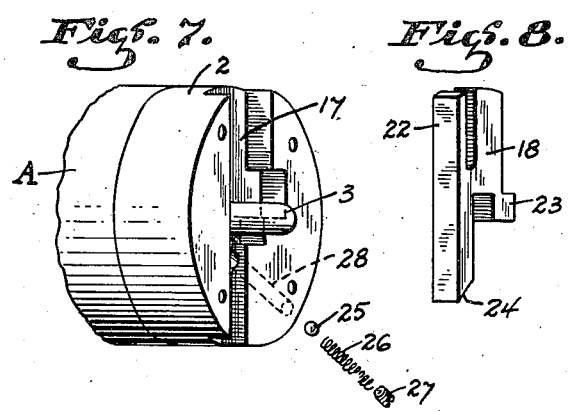
INVENTOR.
Henry Bosch, Jr.
BY
Chas. E. Townsend.
ATTORNEY Jan. 18, 1938.  H. BOSCH, JR  2,105,469
RETRIEVING MECHANISM
Filed June 19, 1935  3 Sheets-Sheet 2

INVENTOR.
Henry Bosch, Jr.
BY
Chas. E. Townsend.
ATTORNEY

Jan. 18, 1938. H. BOSCH, JR 2,105,469
RETRIEVING MECHANISM
Filed June 19, 1935  3 Sheets-Sheet 3

INVENTOR.
Henry Bosch, Jr.
BY
Chas. E. Townsend.
ATTORNEY

Patented Jan. 18, 1938

2,105,469

UNITED STATES PATENT OFFICE 2,105,469

RETRIEVING MECHANISM

Henry Bosch, Jr., San Francisco, Calif.

Application June 19, 1935, Serial No. 27,355

15 Claims. (Cl. 242—107)

This invention relates to retrieving or re-winding mechanisms such as spring re-wound window shades, drums, and reels having cords wound thereabout, and like devices, and especially to means operable in conjunction therewith to prevent a too rapid retrieving or re-winding action.

Practically all window shades in common use today consist of a roller about which the window shade is wound. The roller is supported with relation to the upper portion of a window casing by means of a pair of brackets, one bracket serving as a bearing for one end of the roller, and the other bracket as a support for the opposite end of the roller and also as an anchor member for a rod which extends a substantial distance into the roller. The end of the rod which enters the bracket is flattened and extends into a slot in the bracket and as such is non-rotatable. This rod serves the following functions: First that of supporting one end of the roller; secondly, that of supporting a helical spring; third, that of functioning as an anchor member for one end of the spring. The other end of the spring is secured to the roller, hence when the shade is unwound or lowered the rotational movement of the roller will wind the spring and produce sufficient tension to re-roll the roller when the window shade is to be raised. On the end of the roller adjacent the rod is mounted a pair of gravity actuated pawls which are adapted to engage with ratchet teeth carried by the rod. These pawls will only function when the roller is slowly rotated and they serve the function of securing the roller against re-winding action when the window shade has been lowered.

When it is desired to raise the shade it must be pulled downwardly a slight distance and then raised quickly as one or another of the pawls would otherwise engage, and if the window shade is purposely or accidentally released the roller will re-wind with an exceedingly rapid action; or, plainly speaking "run away" as there is nothing to restrict the re-winding action of the helical spring. There is a stick at the lower end of the window shade and when the shade is fully re-rolled the stick is liable to strike one or another of the supporting brackets and tear the shade and if it does not do so it will run around and around the roller until the spring becomes unwound. Hence, when the shade is to be lowered the next time it will be found that there is not sufficient tension in the spring to cause re-winding of the shade and it must then be taken down and partly re-wound or tensioned before it is possible to retrieve or re-roll the window shade; hence there are two major objections, either that of un-winding the spring or that of tearing the stick from the shade cloth.

The object of the present invention is generally to improve the operation of retrieving or re-winding devices of this character, and particularly to provide a pawl mechanism which is so actuated that if the window shade is accidentally released during the re-rolling operation the pawl will be projected and stop re-winding. More specifically stated, the invention embodies a rotary retrieving re-winding mechanism in the form of a roller, drum, reel, or the like, which may be spring or weight actuated, and a pawl cooperating therewith which is centrifugally projected to engage a stop member the moment the rotating retrieving mechanism exceeds a predetermined speed.

The invention has several different applications and different forms thereof are illustrated in the accompanying drawings, in which—

Fig. 1 is a front view of a window shade roller, said view being partially in section;

Fig. 2 is a perspective view of the rod anchoring bracket;

Fig. 3 is a perspective view of the bearing bracket;

Fig. 4 is a cross section on line IV—IV of Fig. 1;

Fig. 5 is a cross section similar to Fig. 4 showing the pawl in locking position;

Fig. 6 is a section taken on line VI—VI of Fig. 4;

Fig. 7 is a perspective view of the end of the roller which carries the pawl, said view also showing the spring and ball whereby the pawl is maintained in projected position after it has been centrifugally actuated;

Fig. 8 is a perspective view of the pawl;

Figure 9:
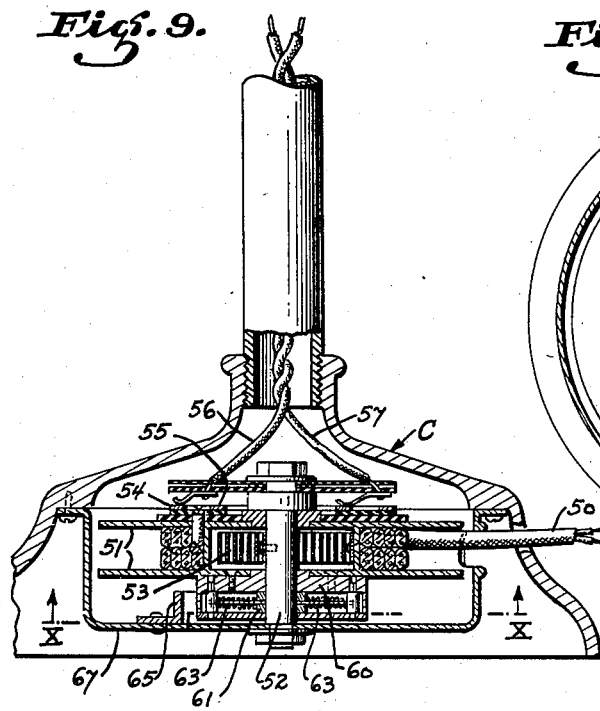
Fig. 9 is a vertical central section of the base portion of an electric floor lamp, said view showing the retrieving mechanism applied to a reel whereby the electric extension cord can be reeled up into the base.
Figure 10:
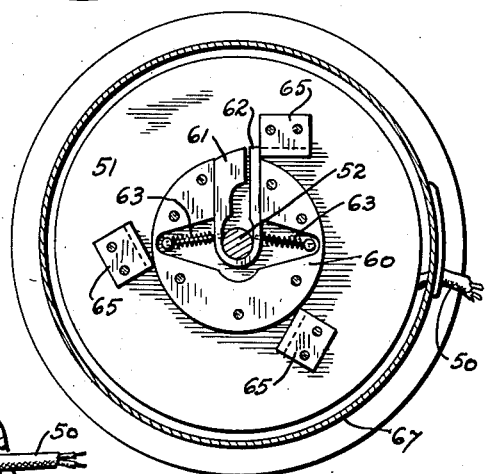
Fig. 10 is a horizontal section taken on line X—X of Fig. 9 looking in the direction of the arrows.
Figure 11:
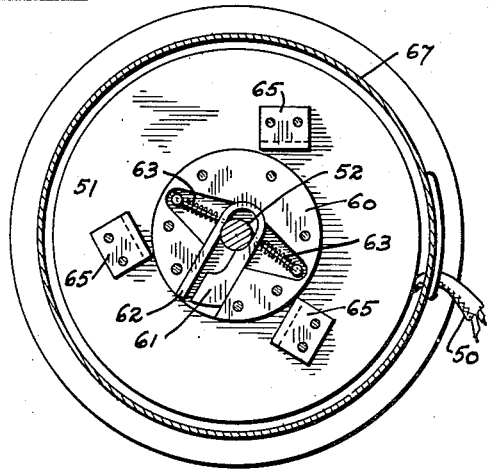
Fig. 11 is a view similar to Fig. 10 showing the pawl in retracted and released position.

Referring to the drawings in detail, and particularly Figs. 1 to 8, inclusive, A indicates a standard form of shade roller about which is wound a window shade indicated at B. Secured at one end of the roller is a cap or bushing 2, having a projecting pin 3 which extends into a shade roller bracket generally indicated at 4. This bracket will be further described and will be referred to as a bearing bracket.

Extending into the opposite end of the roller is a rod 5, the outer end of which is flattened, as indicated at 6, to extend into the slotted portion 7 of a shade roller bracket 8; this bracket being of a standard construction and being best illustrated in Fig. 2. The rod 5 extending through the roller serves three main functions: first, that of a bearing and support for one end of the roller; secondly, that of a support for an helical spring indicated at 9; and, third, as an anchor member for one end of said spring, that is, one end of the spring is secured to the rod as indicated at 10 while the opposite end is secured to the interior of the roller as indicated at 11.

The bearings for the shade roller are formed at opposite ends, the one bearing being the pin indicated at 3, which is journaled in the bracket 4, and the bearing for the opposite end being a bushing 12 surrounding the rod 5 which, in turn, is secured within an external bushing 13; there being also formed a collar 14 adjacent the end of the rod to secure the roller against endwise movement on the rod.

The helical spring is of the usual construction, to wit, that of re-winding the roller when the shade is to be raised, the spring being placed under sufficient tension when the shade is lowered to bring about the re-rolling action. Most shades, as commonly constructed and operated, are as previously stated provided with a pair of gravity actuated pawls which engage and secure the roller against rotation only when slow rotational movement is imparted to the roller; hence if it is desired to raise the shade after it has been lowered it is necessary to exert a slight pull on the shade to disengage the pawl and then to raise the shade rapidly to prevent engagement of the pawls with the ratchet mechanism. During rapid raising of the shade in this manner a person will sometimes release it, and if that is the case, the helical spring will rotate the roller A with such rapidity that damage to the shade is almost certain to occur. That is, a shade stick 15 is secured at the lower end of the shade. During uncontrolled re-winding of the shade the stick is liable to strike one of the shade roller brackets with such force as to tear the shade and, if this does not happen, the shade stick will pass around and around the roller 9, thus causing unwinding of the spring and when the shade is again to be lowered it will have to be removed from the brackets and the spring partly rewound before it will be operable. These defects of tearing the shade or permitting unwinding of the helical spring have been overcome in the present instance by employing a centrifugally actuated pawl, said pawl being projected automatically into engagement with the stop member when the speed of rotation of the shade roller reaches a certain predetermined speed; this pawl being also utilized for securing the shade in lowered position.

The construction of the pawl and the manner in which it is operated will be described in conjunction with Figs. 1, 3, 4, 5, 7 and 8. Formed in the outer end of the cap or bushing 2, see Fig. 7, is a cross slot generally indicated at 17 and slidably mounted therein is a pawl or dog generally indicated at 18. Carrier by the bracket 4, see Fig. 3, is a sleeve 19, on the interior surface of which is formed a cam 20 and a stop shoulder 21. When the shade is assembled and properly positioned in the brackets 4 and 8 the end of the sleeve or cap 2 carrying the pawl 18 will be projected into and will be surrounded by the cam 20; hence if the shade roller A is permitted to rotate beyond a certain speed pawl 18 will be centrifugally projected and as such will engage the shoulder 21 and thereby secure the shade roller against further rotation and the pawl will not be released with relation to said shoulder until the direction of rotation is reversed as by pulling downwardly on the shade.

The pawl 18 has a spring arm 22 formed in its outer end. This arm engages the shoulder 21 when the pawl is projected and it functions as a cushioning member between the stop and the pawl, or in other words, the shade roller so as to prevent too severe shock when the rotation of the roller is stopped. The pawl is also provided with a lug 23 which limits outward movement of the pawl and its innermost end is provided with an inclined face 24 which is engaged by a ball 25 which, in turn, is actuated by a spring 26 and an adjusting screw 27. The ball 25, the spring and the adjusting screw are mounted in an angularly disposed passage 28 formed in the cap. The function of the spring is three-fold. First, by referring to Fig. 4, it will be noted that the tension of the spring holds the ball 25 in contact with a flat surface of the dog, as shown at 30 in Fig. 4. In other words, its first function is that of frictionally securing the pawl against outward projection. However, when the shade roller begins to rotate and reaches a predetermined speed the centrifugal force of the pawl will become sufficiently great to overcome this friction and it will immediately begin to project itself and the moment it starts to project the ball will engage the inclined surface 24 at the inner end of the pawl and the outward motion will then be accelerated so as to cause as rapid projection of the pawl as possible. Hence, the pawl is not only projected by means of centrifugal force but also by projection of the spring and the spring has served a second function, to-wit, that of accelerating the outward projection of the pawl. Its third function is that of securing the pawl in projected position. It should further be noted that the amount of expansion and contraction of the spring 26 is exceedingly slight and the work imposed on the spring is comparatively nil, hence dependable action and long life of this spring is insured. When the dog is projected its stop action is cushioned by the arm 22 and it cannot be retracted until the direction of the roller is reversed, as when pulling down on the shade cloth, and when that is resorted to the outer end of the pawl will engage the inner cam surface 20 and the pawl will become fully retracted and when retracted will be frictionally secured by the ball at the point indicated at 30.

By employing a pawl of this character the usual gravity actuated pawls mounted at the anchor end of the shade roller may be entirely dispensed with as the pawl 18 will not only function to prevent running away of the shade roller but it will also function as a stop member when the shade is lowered, as the only operation necessary when lowering the shade to a certain position is to pull it to that position and release it, as release will permit instantaneous and rapid rotation of the shade roller and will thereafter cause projection and locking by means of the pawl 18. Any damage to the shade is accordingly prevented and unwinding of the spring is prevented, thereby overcoming the two main objections heretofore specified.

Referring to Figs. 14 to 17, inclusive, a modified form of the pawl is shown. In this instance the pawl is indicated at 35 and it will be noted that it is carried on the outer end of a long arm 36 of a bell crank which is pivoted as at 37. The short arm of the bell crank is connected to a toggle rod 38 surrounded by a spring 39. The same type of supporting bracket as shown in Fig. 3 is employed; that is, a bracket having an interior cam 20a and a stop shoulder 21a. When the pawl is retracted the toggle arm will lie in a position off center with relation to the pivot 37 and the outer end of the toggle arm and a spring 39 will thus function to retain the pawl in retracted position. On the other hand, if the shade roller is permitted to rotate beyond a given speed centrifugal action will cause the pawl to be thrown outwardly, hence causing a rocking movement of the bell crank 36 about the pivot 37 with the result that the toggle link swings beyond its offset center position, thus permitting the spring to serve the same function as the spring shown at 26 in Fig. 7, to-wit, that of accelerating the outward motion of the pawl once it has been centrifugally actuated.

Figure 15:
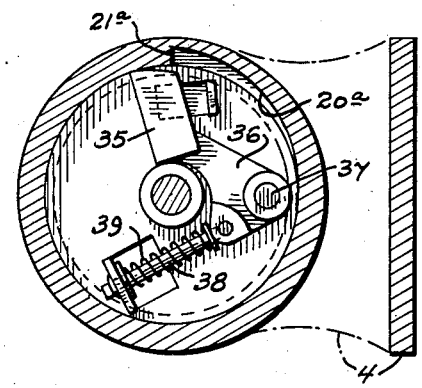
Fig. 15 is a cross section on line XV—XV of Fig. 14.
Figure 16:
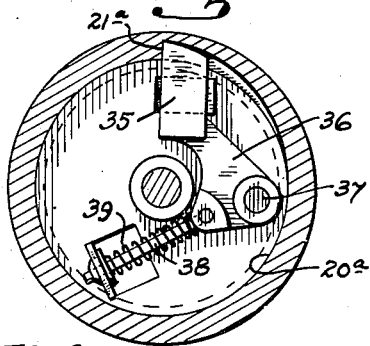
Fig. 16 is a view similar to Fig. 15 but showing the pawl in locking position.
Figure 17:
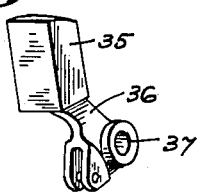
Fig. 17 is a perspective view of the pawl shown in Figs. 14, 15 and 16.

Spring 39 will thus serve the same three functions as the spring 26. First, that of retaining the pawl in retracted position; secondly, that of accelerating centrifugal action when the pawl is being projected; and third, that of holding the pawl in projected position until it is positively depressed or retracted by the cam. The different positions assumed by the pawl 35 are indicated in Figs. 15 and 16 and a perspective view of the pawl itself is shown in Fig. 17, the complete assembly being shown in Fig. 14.

The type of pawl shown in Figs. 1 to 8, inclusive, is known as a floating pawl while the type shown in Figs. 14 to 17 is known as a pivoted type of pawl.

Figure 18:
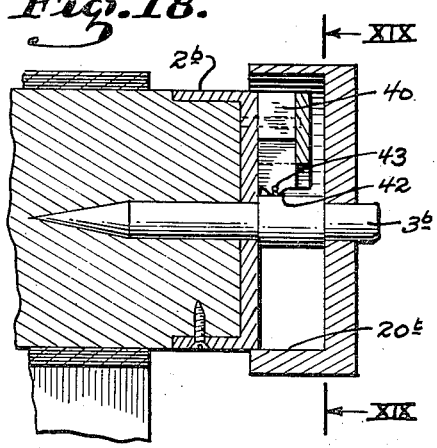
Fig. 18 is a section of one end of a window shade roller showing still another modified form of locking mechanism whereby retrieving movement is controlled.
Figure 19:
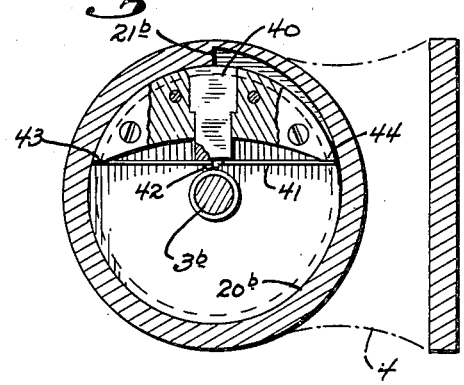
Fig. 19 is a cross section taken on line XIX—XIX of Fig. 18.

A modified form of the floating pawl is shown in Figs. 18 and 19. In this instance the type of bearing bracket shown at 4 in Fig. 1 is again employed; that is, an interior cam surface 20b is provided and a stop shoulder 21b. A cap 2b is secured in the end of the roller and a bearing pin 3b. The outer end of the cap projects within the cam surface and it is slotted to receive a floating pawl, such as shown at 40. A straight wire spring 41 is secured at the inner end of the pawl, as shown at 42. The ends of this spring engage rounded shoulders 43 and 44 formed in the cap and the spring serves only one function, towit, that of retarding outward movement of the pawl, or in other words, tending at all times to secure the pawl against being centrifugally projected. This form of the mechanism is exceedingly simple. When the shade roller is slowly rotated the pawl will remain in retracted position but when it is rotated beyond a certain speed centrifugal action will overcome the tension of the spring wire 41 and the pawl will be centrifugally projected and as such will engage the shoulder 21b. It will there be frictionally held but it will be automatically retracted not only by the cam action indicated at 20b but also by the tension of the spring 42.

The invention so far described has been applied to shade rollers only. Obviously, it will have numerous applications. As an illustration thereof, reference will be made to Figs. 9 to 13, inclusive. In this instance the base portion C of an electric floor lamp is illustrated. Floor lamps are usually provided with a long extension cord 50, which is provided with a plug at one end so that it may be inserted in the wall socket or the like at some convenient point. These cords are always in the way when the lamp is not in use and individuals will trip over the same and will either knock the lamp over, pull the plug out of the socket, or cause other difficulties.

In the present instance a reel 51 is mounted within the base and is journaled to freely rotate about the shaft 52, the reeling action of the reel being obtained by a spring 53 similar to a clock spring which is anchored to the shaft 52 at one end and to the inner surface of the reel at the opposite end. The lamp cord 50 has one end attached to the reel and this end projects through the side of the reel and the two wires contained therein are connected with two collector rings indicated at 54 and 55. These are, in turn, engaged by cooperating brushes as shown which engage the respective rings and the brushes are, in turn, connected to the wires indicated at 56 and 57 which, in turn, are connected to the lamp socket of the floor lamp. When it is desired to employ the extension cord, it is only necessary to grasp the outer end which contains the plug, not here shown, and to pull it out of the base as the pull on the extension cord will cause it to unwind from the reel. When a sufficient amount has been pulled out, it is only necessary to release the cord when the reel will be automatically locked against re-reeling as will be hereinafter described, and after it is locked the plug will be inserted in the base outlet or whatever connection is provided.

The locking mechanism to secure the reel against re-reeling is substantially identical to that shown in connection with the shade rollers and is best illustrated in Figs. 10 to 13, inclusive. It consists of a disc 60 which is secured to the lower face of the reel so as to rotate therewith. The disc is slotted to receive a pawl 61, having a spring arm 62, construction of the pawl being clearly shown in Fig. 13. A pair of toggle arms engage the inner end of the dog. These arms are surrounded by springs 63, as shown, and they lie in grooves or depressions formed in the face of the disc. When the pawl is retracted the spring actuated toggle arms will assume the position shown in Fig. 10. These springs, accordingly, serve the same function as the springs shown in connection with the pivoted type of dog and also the floating pawl shown in Fig. 1. That is, the springs described in Figs. 10 to 12 first function to retain the dog in a retracted position; secondly, to accelerate its movement when centrifugally actuated; and third, that of retaining the pawl in extended position until it is positively and forcibly depressed or retracted.

Figure 12:
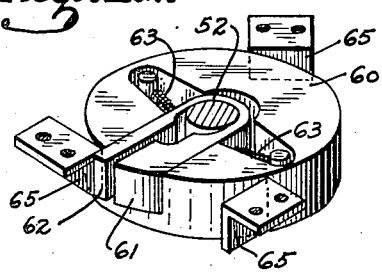
Fig. 12 is a perspective view of the disc in which the pawl is mounted.
Figure 13:
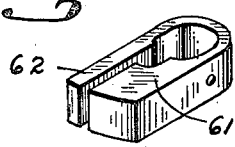
Fig. 13 is a perspective view of the pawl shown in Figs. 10, 11 and 12.
Figure 14:
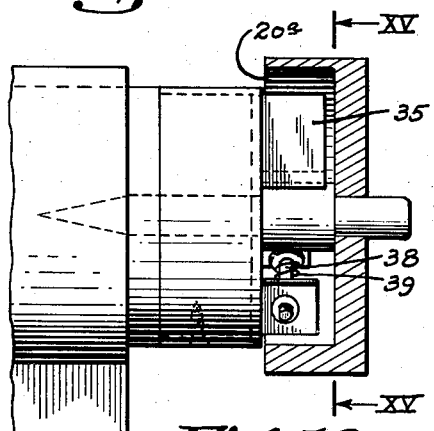
Fig. 14 is a sectional view of one end of a shade roller showing a modified form of the retriever locking mechanism.

Stop lugs, such as shown at 65, are placed around the disc 60 and at an angle thereto, hence if the pawl is centrifugally projected it will engage one or another of these lugs but when the reel is reversed, as by pulling on the extension cord 50, the pawl will engage the inner inclined faces of the lugs and as such will be forcibly depressed or retracted. The function of the mechanism shown in Fig. 12 is that of preventing the reel from running away when the cord is being re-wound; that is, if it is accidentally released the reel will reach the speed where the dog will automatically project and stop further re-reeling. The dog also functions to lock the reel when the cord is extended for use. A housing 67 may enclose the entire mechanism and it may also function as a support for the stop lug 65, and while this and other features have been more or less specifically described and illustrated it will be understood that various changes may be resorted to within the scope of the appended claims. Similarly, it will be understood that the materials and finish of the several parts employed may be such as the manufacturer may decide, or varying conditions or uses may demand.

Having thus described my invention, what I claim and desire to secure by Letters Patent is:

1. A retrieving mechanism for elongated flexible members comprising a rotor to which one end of said member is secured and about which it is wound and from which said flexible member can be unwound by exerting a pull on the free end thereof, means for re-winding the flexible member when it has been unwound, a stop member cooperating with the rotor, a dog carried by the rotor and adapted to be centrifugally projected into engagement with the stop member when the rotor reaches a predetermined speed during re-winding of the flexible member, and means for cushioning engagement between the dog and the stop member.

2. A retrieving mechanism for elongated flexible members comprising a rotor to which one end of said member is secured and about which it is wound and from which said flexible member can be unwound by exerting a pull on the free end thereof, means for re-winding the flexible member when it has been unwound, a stop member cooperating with the rotor, a dog carried by the rotor and adapted to be centrifugally projected into egagement with the stop member when the rotor reaches a predetermined speed during re-winding of the flexible member, and a spring cooperating with the dog, said spring retaining the dog against being centrifugally projected until a predetermined speed is reached.

3. A retrieving mechanism for elongated flexible members comprising a rotor to which one end of said member is secured and about which it is wound and from which said flexible member can be unwound by exerting a pull on the free end thereof, means for re-winding the flexible member when it has been unwound, a stop member cooperating with the rotor, a dog carried by the rotor and adapted to be centrifugally projected into engagement with the stop member when the rotor reaches a predetermined speed during re-winding of the flexible member, a spring cooperating with the dog, said spring retaining the dog against being centrifugally projected until a predetermined speed is reached, and when said dog is centrifugally projected accelerating the projecting movement of the dog and retaining the dog in projected position.

4. A retrieving mechanism for elongated flexible members comprising a rotor to which one end of said member is secured and about which it is wound and from which said flexible member can be unwound by exerting a pull on the free end thereof, means for re-winding the flexible member when it has been unwound, a stop member cooperating with the rotor, a dog carried by the rotor and adapted to be centrifugally projected into engagement with the stop member when the rotor reaches a predetermined speed during re-winding of the flexible member, a spring cooperating with the dog, said spring retaining the dog against being centrifugally projected until a predetermined speed is reached, and when said dog is centrifugally projected accelerating the projecting movement of the dog and retaining the dog in projected position, and means for positively retracting the dog against the action of said spring when the rotor is rotated in the opposite direction.

5. A retrieving mechanism for elongated flexible members comprising a rotor to which one end of said member is secured and about which it is wound and from which said flexible member can be unwound by exerting a pull on the free end thereof, means for re-winding the flexible member when it has been unwound, a stop member cooperating with the rotor, a dog carried by the rotor and adapted to be centrifugally projected into engagement with the stop member when the rotor reaches a predetermined speed during re-winding of the flexible member, and a spring actuated toggle member cooperating with the dog, said toggle member retaining the dog against being centrifugally projected until a predetermined speed is reached and when said dog is centrifugally projected accelerating the projecting movement of the dog and retaining the dog in projected position.

6. A retrieving mechanism for elongated flexible members comprising a rotor to which one end of said member is secured and about which it is wound and from which said flexible member can be unwound by exerting a pull on the free end thereof, means for re-winding the flexible member when it has been unwound, a stop member cooperating with the rotor, and a dog carried by the rotor and adapted to be centrifugally projected into engagement with the stop member when the rotor reaches a predetermined speed during re-winding of the flexible member, said dog having a resilient portion which engages the stop and cushions engagement between the dog and stop member.

7. A retrieving mechanism for elongated flexible members comprising a rotor to which one end of said member is secured and about which it is wound and from which said flexible member can be unwound by exerting a pull on the free end thereof, means for re-winding the flexible member when it has been unwound, a stop member cooperating with the rotor, a dog carried by the rotor and adapted to be centrifugally projected into engagement with the stop member when the rotor reaches a predetermined speed during re-winding of the flexible member, and means cooperating with the dog for retarding centrifugal projection of the dog until a predetermined speed is reached.

8. A retrieving mechanism for elongated flexible members comprising a rotor to which one end of said member is secured and about which it is wound and from which said flexible member can be unwound by exerting a pull on the free end thereof, means for re-winding the flexible member when it has been unwound, a stop member cooperating with the rotor, a dog carried by the rotor and adapted to be centrifugally projected into engagement with the stop member when the rotor reaches a predetermined speed during re-winding of the flexible member, and means cooperating with the dog for retarding centrifugal projection of the dog until a predetermined speed is reached, said means also functioning to accelerate the movement of the dog when projected.

9. A retrieving mechanism for elongated flexible members comprising a rotor to which one end of said member is secured and about which it is wound and from which said flexible member can be unwound by exerting a pull on the free end thereof, means for re-winding the flexible member when it has been unwound, a stop member cooperating with the rotor, a dog carried by the rotor and adapted to be centrifugally projected into engagement with the stop member when the rotor reaches a predetermined speed during re-winding of the flexible member, and means cooperating with the dog for retarding centrifugal projection of the dog until a predetermined speed is reached, said means also functioning to accelerate the movement of the dog when projected and retaining the dog in projected position.

10. A retrieving mechanism for elongated flexible members comprising a rotor to which one end of said member is secured and about which it is wound and from which said flexible member can be unwound by exerting a pull on the free end thereof, means for re-winding the flexible member when it has been unwound, a stop member cooperating with the rotor, a cross slot formed in one end of the rotor, a dog slidably mounted in said slot and adapted to be centrifugally projected when the rotor reaches a predetermined speed during re-winding of the flexible member, and spring actuated means for retarding centrifugal projection of the dog until the rotor reaches a predetermined speed.

11. A retrieving mechanism for elongated flexible members comprising a rotor to which one end of said member is secured and about which it is wound and from which said flexible member can be unwound by exerting a pull on the free end thereof, means for re-winding the flexible member when it has been unwound, a stop member cooperating with the rotor, a cross slot formed in one end of the rotor, a dog slidably mounted in said slot and adapted to be centrifugally projected when the rotor reaches a predetermined speed during re-winding of the flexible member, a flat and an inclined face on the dog, spring actuated means engageable with the flat face of the dog when the dog is retracted and retarding centrifugal projection of the dog until the rotor reaches a predetermined speed during re-winding of the flexible member, said spring actuated member engaging the inclined face of the dog when the dog is centrifugally projected and accelerating the projecting movement during projection.

12. A retrieving mechanism for elongated flexible members comprising a rotor to which one end of said member is secured and about which it is wound and from which said flexible member can be unwound by exerting a pull on the free end thereof, means for re-winding the flexible member when it has been unwound, a stop member cooperating with the rotor, the rotor being journaled in a bearing bracket at each end thereof, a cross slot formed in one end of the rotor, a dog slidably mounted in said slot and adapted to be centrifugally projected when the rotor reaches a predetermined speed during re-winding of the flexible member, a flat and an inclined face on the dog, spring actuated means engageable with the flat face of the dog when the dog is retracted and retarding centrifugal projection of the dog until the rotor reaches a predetermined speed during re-winding of the flexible member, said spring actuated member engaging the inclined face of the dog when the dog is centrifugally projected and accelerating the projecting movement during projection, a sleeve carried by one of the bearing brackets and enclosing the end of the rotor in which the dog is mounted, a stop member within the sleeve with which the dog engages when projecting, and a cam within the sleeve to retract the dog upon reversal of the rotor.

13. A retrieving mechanism for elongated flexible members comprising a rotor to which one end of said member is secured and about which it is wound and from which said flexible member can be unwound by exerting a pull on the free end thereof, means for re-winding the flexible member when it has been unwound, a stop member cooperating with the rotor, a dog carried by the rotor and adapted to be centrifugally projected into engagement with the stop member when the rotor reaches a predetermined speed during re-winding of the flexible member, and a snap-over spring cooperating with the dog, said spring retaining the dog against centrifugal projection until the rotor reaches a predetermined speed and accelerating projection of the dog.

14. A retrieving mechanism for elongated flexible members comprising a rotor to which one end of said member is secured and about which it is wound and from which said flexible member can be unwound by exerting a pull on the free end thereof, means for re-winding the flexible member when it has been unwound, a stop member cooperatng with the rotor, a pivotally mounted dog carried by the rotor adapted to be centrifugally projected into engagement with the stop member when the rotor reaches a predetermined speed during re-winding of the flexible member, and a snap-over spring cooperating with the pivoted dog, said spring retaining the dog against centrifugal projection until the rotor reaches a predetermined speed and then accelerating the projection of the dog.

15. A retrieving mechanism for elongated flexible members comprising a rotor to whicn one end of said flexible member is secured and about which it is wound and from which said flexible member can be unwound by exerting a pull on the free end thereof, means for re-winding the flexible member when it has been unwound, a stop member cooperating with the rotor, a dog carried by the rotor and adapted to be centrifugally projected into engagement with the stop member when the rotor reaches a predetermined speed during re-winding of the flexible member, and means for accelerating the movement of the dog when projected.

HENRY BOSCH, Jr.